United States Patent [19]

Turbak et al.

[11] 4,022,631

[45] May 10, 1977

[54] PROCESS FOR PRODUCING REGENERATED CELLULOSIC ARTICLES

[75] Inventors: Albin F. Turbak, Convent Station; Richard B. Hammer, Morris Plains; Norman A. Portnoy, Hopatcong; Richard E. Davies, Ridgewood, all of N.J.

[73] Assignee: International Telephone and Telegraph Corporation, New York, N.Y.

[22] Filed: May 19, 1975

[21] Appl. No.: 578,934

[52] U.S. Cl. .............................................. 106/168
[51] Int. Cl.$^2$ ........................................ C08L 1/24
[58] Field of Search .......... 106/163, 168, 164–166; 8/116.4; 264/190, 191; 162/82, 158, 157

[56] References Cited

UNITED STATES PATENTS

| | | | |
|---|---|---|---|
| 3,236,669 | 2/1966 | Williams | 106/163 |
| 3,706,526 | 12/1972 | Swidler | 8/116.4 |

*Primary Examiner*—Theodore Morris
*Attorney, Agent, or Firm*—J. B. Raden; H. J. Holt

[57] ABSTRACT

Cellulosic articles are regenerated from a cellulosic solution formed by the addition of cellulosic material to dimethyl sulfoxide and formaldehyde or paraformaldehyde by contacting the cellulosic solution with an aqueous solution having a pH greater than seven of a water soluble nucleophilic compound selected from the group consisting of ammonia, ammonium salts, saturated amines and salts of sulfur compounds in which the sulfur has a valence of less than six.

14 Claims, No Drawings

PROCESS FOR PRODUCING REGENERATED CELLULOSIC ARTICLES

This invention relates to a process for the regeneration of cellulosic articles and more specifically to a process for the regeneration of cellulosic fibers, films and other shaped articles from a solution of cellulosic material in dimethylsulfoxide and formaldehyde.

Rayon is today almost universally produced by the viscose process. However, the high investment costs and mill effluent pollution problems associated with viscose rayon plants makes this process increasingly less competitive from both an economic and environmental standpoint. Processes using organic solvent systems having accordingly been investigated as alternatives to the viscose process.

A number of highly polar, aprotic organic solvents for cellulose have been disclosed in the literature. Two solvents which have received frequent mention ae dimethylformamide and dimethylsulfoxide (DMSO), each in combination with one or more additional compounds such as $N_2O_4$, $SO_2$ or an amine. More recently, DMSO-paraformaldehyde has been reported as a solvent for cellulose.

While there has been much discussion of these and other solvent systems for cellulose, the literature contains little information concerning the regeneration of fibers, films or other regenerated cellulosic articles from such solvent systems. There are almost no data in the literature, for example, on the properties of fibers spun from an organic solvent system. This is believed in large measure to be due to the inapplicability of known viscose or other cellulosic regeneration technology to organic solvent systems. In so far as is known, no processes have as yet been disclosed for producing fibers or films of acceptable commercial properties from such solvent systems nor have any practical or commercial processes yet evolved from these organic solvent systems.

It is an object of the present invention to produce from an organic solvent system regenerated cellulosic articles having properties which are fully comparable to those produced by the viscose process.

It is an additional object of this invention to produce cellulosic articles from an organic solvent system utilizing dimethylsulfoxide and formaldehyde as the solvent medium.

It is a still further object of this invention to provide a process for the regeneration of fibers, films and other shaped cellulosic articles by the use of certain unique regeneration media.

The foregoing and other objects of this invention are accomplished by contacting a cellulosic solution, formed by the addition of cellulosic material to dimethylsulfoxide and an aldehyde selecting from the group consisting of formaldehyde and paraformaldehyde, with a regeneration medium comprising an aqueous solution having a pH greater than 7 of a water soluble nucleophilic compound selected from the group consisting of ammonia, ammonium salts, saturated amines and salts of sulfur compounds in which the sulfur has a valence of less than 6.

The invention is useful for the production of a variety of shaped cellulosic articles including fibers and films. However, it is particularly useful for the production of fibers and will be described hereinafter in connection with such fibers. Such description is solely for purposes of illustration and it should be understood that the invention is not limited with respect to the particular shape or form of the cellulosic article regenerated in accordance with the process herein set out.

Regenerated cellulosic fibers produced in accordance with the invention are fully comparable in properties to cellulosic fibers produced by the viscose process. They are particularly outstanding in having a very low "$S_{6.5}$" solubility, a measure of the fibers' resistance to laundering. Moreover, the process itself provides for rapid dissolution of cellulose, is less sensitive to minor pulp variations than the viscose process and promises to reduce many of the pollution problems associated with viscose mills.

The regeneration media which are useful in the invention are aqueous solutions having a pH greater than seven containing certain water soluble nucleophilic compounds. The nucleophilic compounds are either nitrogeneous compounds or ionic sulfur containing compounds which possess, in addition to their nucleophilic characteristics, the requisite pH and solubility in water. A nucleophilic compound or a nucleophile is a neutral or anionic species which, due to its electronic structure, seeks to attack an electron deficient or electropositive center. Such compounds are their activity in chemical reactions are well known and are described for example in Fieser and Fieser, Advanced Organic Chemistry, Reinhold Publishing Co., N.Y., N.Y., 1961 at pg. 227.

In the case of the nitrogeneous compounds, the coagulant is actually ammonia or an amine; the sources of which may be, in addition to ammonia or the amine itself, an ammonium salt or in some instances a basic amine salt. Under the alkaline conditions of the regeneration solution, ammonium or amine salts will hydrolyze to liberate the free base — ammonia or the amine.

A particularly useful nitrogeneous compound is ammonium hydroxide (a water solution of ammonia). Other nitrogeneous compounds which possess the requisite nucleophilic, solubility and pH properties are salts of ammonia and a weak acid such as ammonium acetate, ammonium sulfide, ammonium carbonate and ammonium bisulfite. Amines which are useful are in general saturated aliphatic, cycloaliphatic and alicyclic amines. Aromatic amines and amines of more than six carbon atoms are normally insoluble or of borderline solubility in water and hence the useful amines are those of six or less carbon atoms. Examples of useful amines are hydroxylamine, methyl-, ethyl-, t-butyl and pentyl-amine, diethylamine, triethylamine, ethylene diamine and ethylene-imine adducts such as diethylene triamine and triethylene tetramine. Other useful amines are cyclohexylamine, pyrrolidine, piperidine and piperazine. Basic amine salts such as methyl or ethyl amine acetate or carbonate may also be used and are intended to be included within the term amines as used herein.

Particularly effective sulfur compounds are sodium sulfide and sodium thiosulfate. However other water soluble, ionic di-, tri-, and tetra- and pentavalent salts of sulfur compounds including sulfides, sulfites, thiosulfates, dithionites and dithionates are also useful. The sulfates, in which sulfur has a valence of six, are not useful. Examples of other useful sulfur compounds are sodium hydrosulfide, sodium sulfite, sodium bisulfite, sodium thiocarbonate, sodium trithiocarbonate, sodium thiocyanate, sodium thioglycolate, sodium thiophosphate and sodium xanthogenate. In addition, the salts of xanthic acid and of low molecular weight organic xanthates may be used such as sodium isopropyl xanthate and sodium ethyl xanthate. The potassium and ammonium salts may be used in place of the foregoing sodium salts. An amount of the nucleophilic compound as little as 0.25% by weight of the regeneration solution has been found effective for regeneration of the cellulose. The maximum concentration is limited only by the solubility of the nitrogenous compound in water. Normally the concentration will range from 3 to 15%.

The regeneration solutions set forth herein will normally but not exclusively be used as the primary coagulation bath for the spinning of fibers or the regeneration of other cellulosic shapes. Thus, it is possible to use the regeneration solutions of the invention as the secondary or tertiary bath in combination with other baths containing coagulants of the inventions or in combination with other baths containing coagulants which, by themselves, are outside the scope of the invention. For purposes of the present invention, it is only necessary that a coagulant bath, whether it be a primary or subsequent bath, comprise the regeneration solution of the invention.

In the preparation of the cellulosic solution, cellulosic material is dissolved in dimethylsulfoxide and formaldehyde or paraformaldehyde, preferably the latter. The solution should be substantially free of water, preferably completely anhydrous and accordingly aqueous formaldehyde solutions should not be used. Gaseous formaldehyde generated by the thermal decomposition of paraformaldehyde is a suitable aldehyde source. The weight ratio of the aldehyde to cellulose should be at least 0.8 parts of the aldehyde to 1 part of cellulose, even more preferably at least 1:1. On a molar basis the ratio of aldehyde to cellulose should be at least 4:1. About 2–14 grams of cellulose per 100 cc of DMSO should be used, preferably 5–8 grams per 100 cc of DMSO. Solution is assisted by heating to from 60° to 189° C, preferably 80° to 120° C. The concentrations will vary with the degree of polymerization of the cellulose, lower concentrations being used for higher DP's. The cellulosic pulps will normally vary from 250 to 1000 DP, a range of 300–800 being preferred.

A critical feature of the invention is the pH of the regeneration medium. A large number of compounds, including, for example, ammonium salts which are known to react rapidly and quantitatively with available or free formaldehyde, have no value as coagulation regeneration promoters because of their acidic nature. Similarly, water alone or lower alcohols produce cellulosic gels which are incapable of being stretched to even the first godet and thus are incapable of producing acceptable fibers.

The dissolution of cellulose in dimethylsulfoxideparaformaldehyde produces a cellulose intermediate, believed to be the hemiacetal, formed between cellulose and $(CH_2O)_x$. The intermediate, which may be precipitated from solutions by addition of the solution to acetone, ethyl ether or alcohols, is relatively stable. It does not melt at temperatures of from 53° to 175° C. It is particularly surprising that the pH of the regeneration medium must be alkaline because hemiacetals are known to be unstable and particularly unstable in acidic solutions. However, we have found that regardless of such theoretical considerations concerning the nature or activity of the intermediate, the regeneration medium must have a pH over 7 to be effective in the invention.

The following examples illustrate the practice of the present invention. All parts and percentages are by weight unless otherwise indicated.

EXAMPLE 1–4

A bleached, prehydrolyzed kraft pulp was alkaline aged to a degree of polymerization (DP) level of about 450, neutralized with 10% acetic acid, washed with water, acetone and air dried. The pulp known as Silvanier-J was cut with a rotary cutter to hasten dissolution.

A solution of this pulp was prepared by adding 5 gms of the pulp and 6 gms of paraformaldehyde to a flask followed by the addition of 100 cc of dimethylsulfoxide (DMSO). The resulting slurry was heated to 110° C. and stirred mechanically for several hours.

Using the same pulp, a series of additional samples were prepared varying the amounts of pulp and paraformaldehyde and the temperatures of dissolution. In each case, 100 cc of DMSO were used. The results of these tests are set forth in Table 1.

TABLE 1

| EXAMPLE | WEIGHT (gms) PULP | $(CH_2O)$ | TEMP. ° C | RESULT |
| --- | --- | --- | --- | --- |
| 1 | 5 | 6 | 110 | Spinnable Solution |
| 2 | 5 | 4.7 | 180 | Partial but spinnable solution |
| 3 | 5 | 2.7 | 170 | No solution |
| 4 | 1 | 0.5 | 189 | No solution |

In Example 2, although only partial solution occurred, a fiber could be spun from the dissolved portion of the solution. Some of the paraformaldehyde vaporized to the top of the flask and for this reason it is desirable to use a ratio of paraformaldehyde to cellulose of about 1 to 1 or greater to compensate for the vaporized paraformaldehyde. At paraformaldehyde to cellulose ratios greater than 1:1, spinnable solutions have been prepared which were microscopically free of gels and unreacted fibers.

EXAMPLE 5–11

Additional solutions were prepared from pulp, paraformaldehyde and DMSO varying the type and DP of the pulp and the ratios of pulp to paraformaldehyde. In all cases, 100 cc of DMSO were used, temperatures of dissolution were from 90°–100° C. and times of dissolution were about 4–5 hrs. Table II records the results of the foregoing examples.

TABLE II

| EXAMPLE | PULP TYPE[1] | WEIGHT (gms) PULP | $(CH_2O)_x$ | RESULT |
| --- | --- | --- | --- | --- |
| 5 | Rayselect-J | 6.2 | 7.4 | Spinnable solution |
| 6 | Rayselect-J | 14.1 | 16.9 | Partial solution Many gels, high viscosity |
| 7 | Cellunier-F | 5 | 6 | Spinnable solution |
| 8 | Cellunier-F | 5 | 4 | Partial solution Some gels and unreacted fiber |
| 9 | Cellunier-F (Oven Dried) | 5 | 6 | Spinnable solution |
| 10 | Cellunier-F (Oven Dried) | 5 | 5 | Spinnable solution |
| 11 | Cellunier-F | 5 | 4 | Spinnable solution |

TABLE II-continued

| EXAMPLE | PULP TYPE[1] | WEIGHT (gms) PULP | WEIGHT (gms) $(CH_2O)_x$ | RESULT |
|---|---|---|---|---|
| | (Oven Dried) | | | |

[1]Rayselect-J is a prehydrolyzed kraft pulp, highly bleached to DP of 563.
Cellunier-F is a bleached sulfite chemical pulp of Southern Pine with a DP of 647.

EXAMPLE 12

Gaseous formaldehyde was prepared by heating paraformaldehyde to decomposition at about 130° C. The gaseous formaldehyde was dissolved in 100 cc of DMSO. At a ratio of formaldehyde to cellulose pulp (Cellunier-F) of 0.84, no solution was obtained. At a ratio of 1.68, a spinnable solution was obtained.

EXAMPLE 13-32

Solutions of cellulose were prepared using the Silvanier-J pulp of Example 1 by charging 120 gm of pulp, 100 gm of paraformaldehyde and 1800 cc of DMSO into a 2 liter vessel. The mixtures were stirred with heating to 100°-110° C. Dissolution occurred in the temperature range of 60°-110° C. within 60 minutes. Heating was discontinued and the solutions allowed to cool to ambient temperature, about 25° C. All solutions were observed microscopically to be free of gels and unreacted fibers. The solutions were then filtered through a 90mm diameter polypropylene, pan-cake, in-line filter during spinning. A 300 hole glass spinnerette having 0.0025 inch holes was employed for all spin trials. Viscosities were measured by a Brookfield Viscometer and found to be in the range of 16–20,000 cps at 22° C. The solutions were deareated under vacuum prior to spinning.

Fibers were spun into a primary bath of ammonium hydroxide of from 0.44 to 4.4% concentration at 30° C. From the primary bath, the fibers were passed vertically to a primary godet, then through a secondary bath to a secondary godet, whose speed could be altered to produce desired stretch conditions. In some cases, a tertiary bath was employed prior to a third godet which was used to introduce further stretch. Total stretch percent is the difference between the circumferential speed of the initial and final godet, divided by the speed of the initial godet, times 100. Table III shows the spinning conditions of each example. Table IV sets forth the properties of fibers produced in accordance with the examples. All test results, in this and in subsequent tables, with the exception of Table V, are the averages for tests of ten single filaments.

TABLE III

| EXAMPLE | PRIMARY BATH COMPOSITION[1] | SECONDARY BATH COMPOSITION[2] | TERTIARY BATH COMPOSITION[3] | TOTAL % STRETCH | SPEED[4] m/min. |
|---|---|---|---|---|---|
| 13 | 2.94% NH$_4$OH | Water | — | 45 | 29 |
| 14 | 1.47% NH$_4$OH | Water | — | 37.8 | 28.8 |
| 15 | 1.47% NH$_4$OH | Water | — | 30 | 36 |
| 16 | 1.47% NH$_4$OH | Water | — | 26.7 | 45 |
| 17 | 1.47% NH$_4$OH | Water | 10.0% NaOH | 52.8 | 32.4 |
| 18 | 1.47% NH$_4$OH | Water | — | 45.5 | 30.4 |
| 19 | 1.47% NH$_4$OH | Water | — | 9.4 | 66.2 |
| 20 | 1.47% NH$_4$OH | Water | — | 7.8 | 64.4 |
| 21 | 1.47% NH$_4$OH | Water | — | 4.7 | 67.1 |
| 22 | 1.47% NH$_4$OH | Water | — | 6.2 | 57.9 |
| 23 | 1.47% NH$_4$OH | Water | — | 25.8 | 32.2 |
| 24 | .88% NH$_4$OH | Water | 8.82% NH$_4$OH | 36.8 | 27.5 |
| 25 | .88% NH$_4$OH | Water | 8.82% NH$_4$OH | 34.7 | 27.4 |
| 26 | .44% NH$_4$OH | Water | 8.82% NH$_4$OH | 34.7 | 27.4 |
| 27 | .44% NH$_4$OH | Water | 8.82% NH$_4$OH | 29.7 | 27.9 |
| 28 | .88% NH$_4$OH | Water | — | 23.4 | 33.8 |
| 29 | 4.4% NH$_4$OH | 10% H$_2$SO$_4$ | 20% NaHCO$_3$ | 18.2 | 23.1 |
| 30 | 4.4% NH$_4$OH | 10% H$_2$SO$_4$ | 20% NaHCO$_3$ | 23.1 | 25.9 |
| 31 | 4.4% NH$_4$OH | 10% H$_2$SO$_4$ | — | 19.0 | 23.1 |
| 32 | 4.4% NH$_4$OH | 10% H$_2$SO$_4$ | 20% NaHCO$_3$ | 26.9 | 24.9 |

[1]Bath Temperature 30° C.
[2]Bath Temperature 12° C. in Examples 13–29; 22°C. in Examples 30–32.
[3]Bath Temperature 22° C.
[4]Speed of final or take-up godet.

TABLE IV

| EXAMPLE | DENIER[1] | TENACITY, g/d[1] COND. | TENACITY, g/d[1] WET | ELONGATION %[2] COND. | ELONGATION %[2] WET | WET MODULUS g/d | [5]S6.5(%)[3] |
|---|---|---|---|---|---|---|---|
| 13 | 4.17 | 2.2 | 0.69 | 6.1 | 10.3 | 0.30 | 11 |
| 14 | 1.09 | 1.48 | 0.71 | 5.4 | 10.2 | 0.38 | 12.3 |
| 15 | 0.82 | 1.89 | 0.83 | 5.4 | 8.6 | 0.46 | — |
| 16 | 0.73 | 1.50 | 0.86 | 5.3 | 8.1 | 0.53 | 13.1 |
| 17 | 1.25 | 1.77 | 0.91 | 10.6 | 14.3 | 0.33 | — |
| 18 | 1.21 | 1.38 | 0.67 | 4.2 | 13.4 | 0.28 | 15.3 |
| 19 | 1.05 | 1.37 | 0.62 | 4.2 | 8.6 | 0.37 | — |
| 20 | 1.14 | 1.38 | 0.52 | 6.0 | 7.9 | 0.28 | 16.2 |
| 21 | 1.11 | 1.58 | 0.53 | 6.1 | 9.4 | 0.26 | — |
| 22 | 1.57 | 1.20 | 0.44 | 7.6 | 12.9 | 0.19 | 15.2 |
| 23 | 2.83 | 1.45 | 0.63 | 6.3 | 12.6 | 0.24 | — |
| 24 | 1.16 | 1.74 | 0.93 | 6.2 | 9.2 | 0.48 | 14.5 |
| 25 | 1.29 | 1.59 | 0.83 | 6.1 | 9.0 | 0.40 | — |
| 26 | 1.34 | 1.24 | 0.90 | 3.7 | 9.4 | 0.39 | 15.0 |
| 27 | 1.35 | 1.07 | 0.74 | 3.6 | 10.7 | 0.33 | — |
| 28 | 1.53 | 1.34 | 0.74 | 3.8 | 8.9 | 0.41 | 14.7 |
| 29 | 0.90 | 1.32 | 0.75 | 3.7 | 10.3 | 0.31 | 12.0 |
| 30 | 0.80 | 1.32 | 0.75 | 3.5 | 7.9 | 0.40 | 11.5 |
| 31 | 0.99 | 1.25 | 0.61 | 3.6 | 7.3 | 0.36 | — |

TABLE IV-continued

| EXAMPLE | DENIER[1] | TENACITY, g/d[1] COND. | WET | ELONGATION %[2] COND. | WET | WET MODULUS g/d | [5]S6.5(%)[3] |
|---|---|---|---|---|---|---|---|
| 32 | 1.44 | 1.31 | 0.62 | 3.4 | 7.4 | 0.40 | 14.6 |

[1]As measured by ASTM Test No. D-1577-66.
[2]As measured by ASTM Test No. D-540-64.
[3]The solubility of fibers in 6.5% NaOH at 20° C.

Tables III and IV indicate that fibers may be produced over a broad range of concentrations, although fiber properties improve with an increase in concentration. The fiber physical properties are at least those of normal rayon fibers produced by the viscose process. The $S_{6.5}$ solubility data shows exceptionally good results. The solubility in a 6.5% caustic solution of viscose rayon ranges from 20–30%, as contrasted with 11–16% for the fibers of these examples.

EXAMPLES 35–43

Cellulosic solutions were prepared, filtered and spun as set forth in Examples 13–32. A 150 hole platinum spinnerette having 0.0025 inch holes was used for the spin trials. Fibers were spun into a variety of spin baths and then passed through a secondary bath of either water or ammonium hydroxide. Table VI shows the spinning conditions and Table VII the fiber properties of each example.

TABLE VI

| EXAMPLE | PRIMARY BATH COMPOSITION | SECONDARY BATH COMPOSITION | TOTAL % STRETCH | SPEED M/MIN. |
|---|---|---|---|---|
| 35 | 4% Na$_2$S | Water | 40.3 | 26.8 |
| 36 | 4% Na$_2$S | 4.4% NH$_4$OH | 38.8 | 26.8 |
| 37 | 20% TMAH[1] | Water | 96.4 | 32.4 |
| 38 | 10% Na$_2$SO$_3$ | Water | 50.7 | 31.5 |
| 39 | 10% CH$_3$NH$_2$ | Water | 32.6 | 30.9 |
| 40 | 10% (C$_2$H$_5$)$_2$NH | Water | 36.5 | 27.7 |
| 41 | 10% Na$_2$S$_2$O$_3$ | Water | 73.9 | 20.0 |
| 42 | 10% Na$_2$S$_2$O$_3$ | Water | 50.0 | 30.0 |
| 43 | 12.5% (CH$_3$)$_3$N | Water | 68.5 | 26.8 |

[1]TMAH is tetramethylene ammonium hydroxide.

TABLE VII

| EXAMPLE | DENIER | TENACITY g/d COND. | WET | ELONGATION, % COND. | WET | WET MODULUS g/d | $S_{6.5}$% |
|---|---|---|---|---|---|---|---|
| 35 | 0.78 | 2.41 | 0.98 | 5.6 | 7.6 | 0.56 | 8.3 |
| 36 | 0.60 | 2.58 | 1.32 | 5.0 | 7.4 | 0.85 | 9.0 |
| 37 | 2.79 | 2.05 | 0.82 | 17.1 | 18.1 | 0.20 | — |
| 38 | 1.94 | 2.46 | 0.86 | 6.8 | 8.0 | 0.47 | — |
| 39 | 4.20 | 1.64 | 0.71 | 4.4 | 12.5 | 0.25 | — |
| 40 | 1.70 | 1.44 | 0.77 | 6.11 | 9.9 | 0.34 | 14.1 |
| 41 | 1.82 | 2.43 | 1.18 | 5.5 | 7.1 | 0.65 | 6.2 |
| 42 | 1.65 | 2.09 | 0.99 | 5.3 | 8.3 | 0.56 | 9.5 |
| 43 | 4.88 | 1.01 | 0.67 | 13.2 | 18.1 | 0.17 | — |

EXAMPLES 33 AND 34

Solutions of cellulose prepared as in Examples 13–32 were spun into a primary bath of aqueous ammonium carbonate and aqueous ammonium hydroxide in isopropanol. The coagulants were not as effective as an aqueous coagulant although fibers of acceptable properties could be prepared. The ammonium salts required somewhat higher concentrations than ammonia to increase the rate of regeneration. The slower rate of regeneration may however be useful in those instances where it is desirable to more closely control the coagulation and orientation of the fiber. The results are set forth in Table V.

The data of Table VII again show fibers whose physical properties are at least equivalent to those of normal rayon produced by the viscose process. In the case of the sulfur compounds, sodium sulfide (Examples 35 and 36) and sodium thiosulfate (Examples 41 and 42), $S_{6.5}$ solubility was even lower than that for the nitrogen compounds and considerably below the 20–30% normal range for viscose rayon.

Solutions of cellulose in DMSO and paraformaldehyde were prepared as set forth in Examples 13–32 and attempts were made to spin fibers in primary baths, or primary and secondary baths, of regenerating solutions outside the scope of the invention. The solutions tested

TABLE V

| EXAMPLE | PRIMARY BATH | DENIER | TENANCITY, g/d COND. | WET | ELONGATION, % COND. | WET | WET MODULUS g/d |
|---|---|---|---|---|---|---|---|
| 33 | 15% ammonium[1] carbonate | 0.86 | 2.70 | 1.21 | 4.14 | 10.41 | 0.50 |
| 34 | 14.7% aqueous ammonium hydroxide/ isopropanol | 0.60 | 2.04 | 0.92 | 3.5 | 4.6 | 0.92 |

[1]The fibers for this test were passed thru a secondary bath of 4.4% NH$_4$OH.

included water; isopropanol; isopropanol-water mixtures; 20% nitric acid; 10% and 20% sulfuric acid; 30% hydrochloric acid; 6% sodium bicarbonate; 20% sodium sulfate; 15% ammonium chloride and 15 and 40% ammonium sulfate; morpholine and triethanol amine non-aqueous solutions; acetone; 3% potassium hydroxide and 3% potassium hydroxide in isopropanol; ammonia in methanol, ethanol, DMSO and isopropanol; 10% aqueous pyridine; and 15% formamide. In all cases, either insufficient regeneration occured to permit full processing and testing of the fiber or the physical properties were unacceptably low.

While the invention has been illustrated with the use of chemical pulps, the invention may utilize as a cellulose source a wide variety of cellulosic pulps, either sulfite or kraft, bleached or unbleached, oxidized or unoxidized. Other useful cellulosic sources are cotton linters, reprocessed cellulose and purified bast fibers.

We claim:

1. A process for producing a regenerated cellulosic article from a cellulosic solution formed by the addition of cellulosic material to dimethyl sulfoxide and an aldehyde selected from the group consisting of formaldehyde and a paraformaldehyde comprising contacting said cellulosic solution with a regeneration medium comprising an aqueous solution having a pH greater than 7 of from 0.25% to the maximum solubility of the compound in water of a water soluble nucleophilic compound selected from the group consisting of ammonia, ammonium salts, saturated amines and salts of sulfur compounds in which the sulfur has a valence of less than 6.

2. The process of claim 1 in which the nucleophilic compound is a nitrogenous compound.

3. The process of claim 1 in which the nucleophilic compound is a salt of a sulfur compound.

4. The process of claim 2 in which the nucleophilic compound is ammonia.

5. The process of claim 2 in which the nucleophilic compound is an ammonium salt.

6. The process of claim 2 in which the nucleophilic compound is a saturated amine.

7. The process of claim 3 in which the salt is selected from the group consisting of sulfides and thiosulfates.

8. The process of claim 7 in which the salt is sodium sulfide.

9. The process of claim 7 in which the salt is sodium thiosulfate.

10. The process of claim 1 in which the ratio by weight of the aldehyde to the cellulose in said cellulosic solution is at least 0.8 parts of the aldehyde to 1 part of cellulose.

11. The process of claim 1 in which the aldehyde is paraformaldehyde.

12. The process of claim 1 in which the cellulosic solution is anhydrous.

13. The process of claim 1 in which the cellulosic solution is heated to a temperature of from 60°–189° C in order to promote solution of the cellulosic material.

14. The process of claim 1 in which the cellulosic article is a fiber and the cellulosic solution is spun into the regeneration medium.

* * * * *